United States Patent
Wilson et al.

(10) Patent No.: US 12,508,233 B2
(45) Date of Patent: Dec. 30, 2025

(54) GRAFT COPOLYMERS, METHODS OF FORMING GRAFT COPOLYMERS, AND METHODS OF USE THEREOF

(71) Applicant: Vanderbilt University, Nashville, TN (US)

(72) Inventors: John T. Wilson, Nashville, TN (US); Daniel Shae, Nashville, TN (US); Dinh Chuong Nguyen, Ho Chi Minh (VN)

(73) Assignee: Vanderbilt University, Nashville, TN (US)

( * ) Notice: Subject to any disclaimer, the term of this patent is extended or adjusted under 35 U.S.C. 154(b) by 1043 days.

(21) Appl. No.: 17/290,618

(22) PCT Filed: Oct. 30, 2019

(86) PCT No.: PCT/US2019/058945
§ 371 (c)(1),
(2) Date: Apr. 30, 2021

(87) PCT Pub. No.: WO2020/092633
PCT Pub. Date: May 7, 2020

(65) Prior Publication Data
US 2022/0008346 A1 Jan. 13, 2022

Related U.S. Application Data

(60) Provisional application No. 62/752,871, filed on Oct. 30, 2018.

(51) Int. Cl.
*A61K 9/50* (2006.01)
*C08F 290/06* (2006.01)

(52) U.S. Cl.
CPC ........ *A61K 9/5026* (2013.01); *C08F 290/062* (2013.01); *C08F 2438/03* (2013.01)

(58) Field of Classification Search
CPC .... A61K 9/5026; A61K 47/32; A61K 31/688; C08F 290/062; C08F 2438/03; C08F 220/286; A61P 35/00
See application file for complete search history.

(56) References Cited

U.S. PATENT DOCUMENTS

2013/0011362 A1* 1/2013 Monahan ............... A61K 47/58
544/258

FOREIGN PATENT DOCUMENTS

WO WO-2007003782 A2 * 1/2007 .......... C07C 327/36
WO WO20090140427 A2 11/2009

OTHER PUBLICATIONS

Wilson et al. (The AAPS Journal, vol. 17, No. 2, Mar. 2015) "Enhancement of MHC-I Antigen Presentation via Architectural Control of pH-Responsive, Endosomolytic Polymer Nanoparticles" (Year: 2015).*

(Continued)

*Primary Examiner* — Ali Soroush
*Assistant Examiner* — Karen Ketcham
(74) *Attorney, Agent, or Firm* — Stites & Harbison PLLC; Richard S. Myers, Jr.

(57) ABSTRACT

A graft copolymer and a method of delivering an active agent to a subject are provided. The graft copolymer includes a polymer backbone, a hydrophilic segment grafted to the polymer backbone, a pH-responsive segment grafted to the polymer backbone, and an endosomal disruption segment grafted to the polymer backbone. The method of delivering an active agent to a subject includes encapsulating the active agent with the graft copolymer and administering the encapsulated active agent to the subject.

18 Claims, 13 Drawing Sheets

(56) References Cited

OTHER PUBLICATIONS

Madikizela et al. (Journal of Pharmaceutical and Biomedical Analysis 147 (2018) 624-633) "Applications of molecularly imprinted polymers for solid-phase extraction of non-steroidal anti-inflammatory drugs and analgesics from environmental waters and biological samples" available online Apr. 23, 2017 (Year: 2017).*
National Center for Biotechnology Information PubChem Compound Summary for CID 58283676, 4-Cyano-4-[(ethylsulfanylthiocarbonyl)sulfanyl]pentanoic acid. Retrieved Nov. 25, 2024 from https://pubchem.ncbi.nlm.nih.gov/compound/58283676. Create Aug. 19, 2012, Modify Nov. 23, 2024 (Year: 2012).*
htttps://www.thermofisher.com/order/catalog/product/77720 Bond Breaker TCEP Solution (Year: 2024).*
Discher, D.E.; Ahmed, F., Polymersomes, Annu. Rev. Biomed. Eng, 2006, pp. 323-341.
Manganiello, M. J.; Cheng, C.; Convertine, A. J.; Bryers, J. D.; Stayton, P. D., Diblock copolymers with tunable pH transitions for gene delivery, Biomaterials Mar. 2012; 33(7); 2301-2309.
Shae, D. et al., Endosomolytic polymersomes increase the activity of cyclic dinucleotide STING agonists to enhance cancer immunotherapy, Nat. Nanotechnol. 14, 269 (2019).
Negar Ghasdian et al: 11 ABC Triblock Copolymer Micelles: Spherical Versus Worm-Like Micelles Depending on the Preparation Method, Macromolecular Rapid Communications, vol. 36, No. 6, Mar. 1, 2015, pp. 528-532.
David Fournier et al: Tunable pH- and Temperature-Sensitive Copolymer Libraries by Reversible Addition-Fragmentation Chain Transfer Copolymerizations of Methacrylates, Macromolecules, vol. 40, No. 4, Feb. 1, 2007 (Feb. 1, 2007), pp. 915-920.
Deedee Smith et al: RAFT-synthesized copolymers and conjugates designed for therapeutic delivery of siRNA, Polymer Chemistry, vol. 2, No. 7, Jan. 1, 2011 (Jan. 1, 2011), p. 1428.
Meredith A. Jackson et al: 11 Zwitterionic Nanocarrier Surface Chemistry Improves siRNA Tumor Delivery and Silencing Activity Relative to Polyethylene Glycol, ACS Nano, vol. 11, No. 6, Jun. 7, 2017 (Jun. 7, 2017), pp. 5680-5696.

* cited by examiner

GRAFT COPOLYMERS, METHODS OF FORMING GRAFT COPOLYMERS, AND METHODS OF USE THEREOF

RELATED APPLICATIONS

This application claims the benefit of U.S. Provisional Application Ser. No. 62/752,871, filed Oct. 30, 2018, the entire disclosure of which is incorporated herein by this reference.

GOVERNMENT INTEREST

This invention was made with government support under grant numbers 1R21AI121626-01A1 awarded by the National Institute of Health (NIH), BC150791 awarded by Congressionally Directed Medical Research Programs (CDMRP), and CBET-1554623 awarded by the National Science Foundation (NSF). The government has certain rights in the invention.

TECHNICAL FIELD

The present-disclosed subject matter relates to graft copolymers, methods of forming graft copolymers, and methods of use thereof. In particular, the presently-disclosed subject matter relates to self-assembling poly(ethylene glycol) graft copolymer poly electrolytes for intracellular drug deliver, methods of forming such copolymers, and methods of use thereof.

BACKGROUND

Self-assembled cationic block copolymer (C-BCP) nanoparticles have been extensively studied as a drug delivery vehicle for cytosolically active therapeutics (FIG. 1). These C-BCP nanoparticles have demonstrated ability as a nanocarrier to enhance the efficacy of cytosolically active drugs by surmounting obstacles in cytosolic drug delivery. Additionally, certain design considerations of these C-BCP nanoparticles can be tailored to provide desired properties. For example, appropriate self-assembly morphology may be selected to provide improved drug loading, high hydrophobic molecular weight may be selected to provide increased endosomal escape, and cationic-hydrophobic content may be balanced to provide improved drug delivery efficacy. However, this system is limited in efficacy for delivery of hydrophilic drugs such as cGAMP, necessitating post-formulation modifications such as crosslinking Accordingly, there remains a need for compositions and methods that provide improved cytosolic drug delivery.

SUMMARY

The presently-disclosed subject matter meets some or all of the above-identified needs, as will become evident to those of ordinary skill in the art after a study of information provided in this document.

This summary describes several embodiments of the presently-disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently-disclosed subject matter, whether listed in this summary or not. To avoid excessive repetition, this summary does not list or suggest all possible combinations of such features.

In some embodiments, the presently-disclosed subject matter includes a graft copolymer including a polymer backbone, a hydrophilic segment grafted to the polymer backbone, a pH-responsive segment grafted to the polymer backbone, and an endosomal disruption segment grafted to the polymer backbone. In one embodiment, the polymer backbone includes a structure according to Formula II:

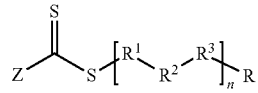

Formula II where R includes a group that stabilizes a radical during reversible addition-fragmentation chain-transfer (RAFT) polymerization, Z includes a group that affects the stability of the S=C bond and the stability of the adduct radical during the RAFT polymerization, each of $R^1$, $R^2$, and $R^3$ independently represent one of the hydrophilic segment, the pH-responsive segment, and the endosomal disruption segment, and n is between 1 and 300. In some embodiments, the graft copolymer further comprising a hydrophilic weight fraction selected from the group consisting of up to about 25% and between about 26% and about 30%.

In some embodiments, R includes alkyl, substituted alkyl, cycloalkyl, substituted cycloalkyl, aryl, substituted aryl, S, $SR^1$, N, $NR^1$, $N(R^1)_2$, or a combinations thereof. In one embodiment, $R^1$ includes alkyl, substituted alkyl, cycloalkyl, substituted cycloalkyl, aryl, substituted aryl, or a combination thereof. In another embodiment, R is 4-cyano-4-yl-pentanoic acid. In some embodiments, Z includes alkyl, substituted alkyl, cycloalkyl, substituted cycloalkyl, aryl, substituted aryl, S, $SR^1$, N, $NR^1$, $N(R^1)_2$, or a combination thereof. In one embodiment, $R^1$ includes alkyl, substituted alkyl, cycloalkyl, substituted cycloalkyl, aryl, substituted aryl, or a combination thereof. In another embodiment, Z is phenyl. In some embodiments, when n is greater than 1, at least one repeat unit comprises a different combination of $R^1$, $R^2$, and $R^3$ from one or more other repeat units.

In some embodiments, the hydrophilic segment includes methacrylates of polyethers, polyesters, polycarbonates, polyvinyls, polyamino acids, polysulfobetaines, carboxybetaines, or a combination thereof. In one embodiment, the hydrophilic segment is poly(ethylene glycol) methyl ether methacrylate. In another embodiment, the hydrophilic segment is linked to the backbone through a cleavable bond. In some embodiments, the pH-responsive segment is an amine containing monomer. In one embodiment, the amine containing monomer includes protonatable amine containing monomers, tertiary amine containing monomers, or a combination thereof. In one embodiment, the amine containing monomer comprises a pKa of between about 3 and about 9. In some embodiments, the pH-responsive segment includes (2-diethylamino)ethyl methacrylate (DEAEMA), 2-(dimethylamino)ethyl methacrylate, 2-(diisopropylamino)ethyl methacrylate, 2-N-morpholinoethyl methacrylate, 2-amino methacrylate hydrochloride, or a combination thereof. In some embodiments, the endosomal disruption segment is a hydrophobic monomer. In one embodiment, the hydrophobic monomer includes acrylates, alkyl methacrylates, methacrylates with fluorinated or aromatic pendant groups, related monomers, or a combination thereof. In another embodiment, the endosomal disruption segment is butyl methacrylate.

In some embodiments, the graft copolymer has the structure:

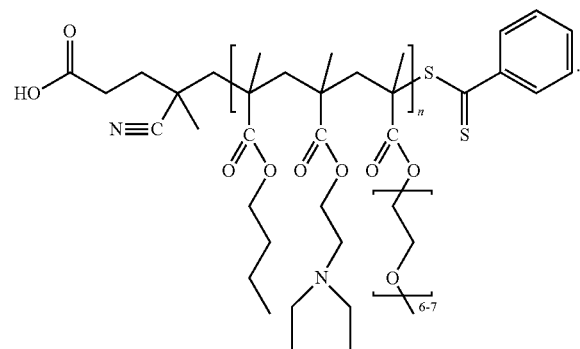

Also provided herein, in some embodiments, is a method of delivering an active agent to a subject in need thereof, the method including encapsulating the active agent with the graft copolymer of claim 1 and administering the encapsulated active agent to the subject.

Further features and advantages of the presently-disclosed subject matter will become evident to those of ordinary skill in the art after a study of the description, figures, and non-limiting examples in this document.

BRIEF DESCRIPTION OF THE DRAWINGS

The presently-disclosed subject matter will be better understood, and features, aspects and advantages other than those set forth above will become apparent when consideration is given to the following detailed description thereof. Such detailed description makes reference to the following drawings, wherein.

Figure 1:
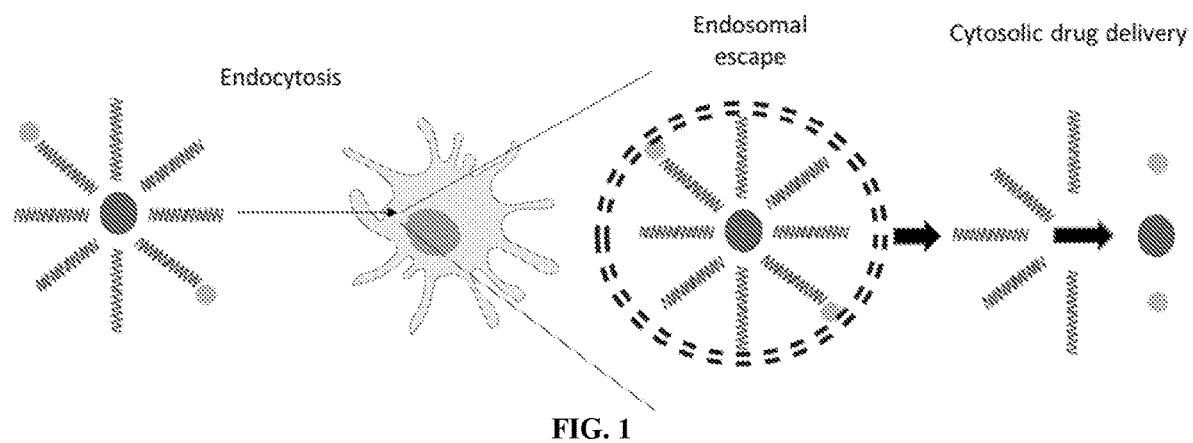
FIG. 1 shows a schematic of a drug delivery process with cationic polymeric nanopolymers (NPs).

While the disclosure is susceptible to various modifications and alternative forms, specific embodiments thereof have been shown by way of example in the drawings and are herein described below in detail. It should be understood, however, that the description of specific embodiments is not intended to limit the disclosure to cover all modifications, equivalents and alternatives falling within the spirit and scope of the disclosure as defined by the appended claims.

Definitions

Unless defined otherwise, all technical and scientific terms used herein have the same meaning as commonly understood by one of ordinary skill in the art to which the disclosure belongs. Any methods and materials similar to or equivalent to those described herein can be used in the practice or testing of the present disclosure, including the methods and materials are described below.

Following long-standing patent law convention, the terms "a," "an," and "the" refer to "one or more" when used in this application, including the claims. Thus, for example, reference to "a cell" includes a plurality of cells, and so forth.

The terms "comprising," "including," and "having" are intended to be inclusive and mean that there may be additional elements other than the listed elements.

Unless otherwise indicated, all numbers expressing quantities of ingredients, properties such as reaction conditions, and so forth used in the specification and claims are to be understood as being modified in all instances by the term "about." Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration, percentage, or the like is meant to encompass variations of in some embodiments ±50%, in some embodiments ±40%, in some embodiments ±30%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself.

For example, if the value "10" is disclosed, then "about 10" is also disclosed. It is also understood that each unit between two particular units are also disclosed. For example, if 10 and 15 are disclosed, then 11, 12, 13, and 14 are also disclosed.

All combinations of method or process steps as used herein can be performed in any order, unless otherwise specified or clearly implied to the contrary by the context in which the referenced combination is made.

DETAILED DESCRIPTION

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

Figure 2A:
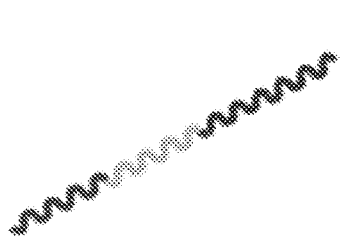
FIGS. 2A-B show a side by side comparison of (A) block copolymer structure and (B) graft copolymer.
Figure 2B:
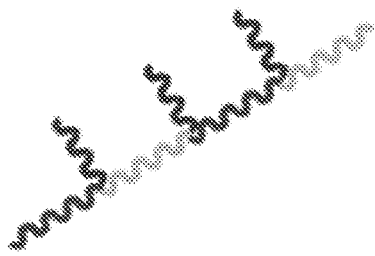

The presently-disclosed subject matter includes polymers, polymeric vesicles, methods of forming polymeric vesicles, and methods of using polymeric vesicles. In some embodiments, the polymer comprises a graft copolymer. Referring to FIGS. 2A-B, in one embodiment, as opposed to existing block copolymers with linear architecture (FIG. 2A), the graft copolymer (FIG. 2B) includes a graft architecture having a linear backbone with one or more branches extending therefrom. In another embodiment, the one or more branches include at least one endosomal disruption segment, at least one pH-responsive segment, and/or at least one hydrophilic segment grafted thereto.

The polymer backbone includes any suitable backbone upon which the one or more branches can be grafted to. In some embodiments, the backbone includes a dithioester according to Formula I below:

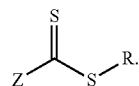

Formula I

R includes any group suitable for stabilizing a radical during reversible addition-fragmentation chain-transfer (RAFT) polymerization, such as, but not limited to, alkyl, substituted alkyl, cycloalkyl, substituted cycloalkyl, aryl, substituted aryl, S, $SR^1$, N, $NR^1$, $N(R^1)_2$, or a combination thereof; Z includes any group suitable for affecting the stability of the S=C bond and the stability of the adduct radical during RAFT polymerization, such as, but not limited to, alkyl, substituted alkyl, cycloalkyl, substituted cycloalkyl, aryl, substituted aryl, S, $SR^1$, N, $NR^1$, $N(R^1)_2$, or a combination thereof; and $R^1$ includes, but is not limited to, alkyl, substituted alkyl, cycloalkyl, substituted cycloalkyl, aryl, substituted aryl, or a combination thereof. The substitutions in the groups above may include, but are not limited to, alkyl, carboxy, cyano, aryl, amine, fluoro, O, OH, and/or N groups, or combinations thereof. For example, one suitable R group includes 4-cyano-4-yl-pentanoic acid and one suitable Z group includes phenyl. In one embodiment, the dithioester according to Formula I includes, but is not limited to, dithiobenzoate, trithiocarbonate, dithiocarbamate, or a combination thereof. In another embodiment, the dithioester includes 4-Cyano-4-(phenylcarbonothioylthio)pentanoic acid, which has the following structure:

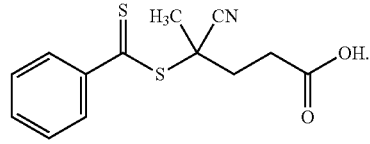 [SMILES: CC(C#N)(CCC(=O)O)SC(=S)c1ccccc1]

Although described above with regard to Formula I and specific variable for Z and R, as will be appreciated by those skilled in the art, the disclosure is not so limited and the backbone may include any other suitable RAFT agent.

The one or more branches are grafted to the backbone between the S and R groups, as shown in Formula II below:

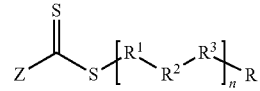

Formula II

Where n is at least 1, between 1 and 300, or any combination, sub-combination, range, or sub-range thereof; and each of $R^1$, $R^2$, and $R^3$ independently includes a hydrophilic segment, a pH-responsive segment, or an endosomal disruption segment. $R^1$, $R^2$, and $R^3$ may be in the same or different orders between each repeat unit. For example, in one embodiment, each unit may include $R^1$—$R^2$—$R^3$ in the S to R direction. In another embodiment, one unit may include $R^1$—$R^2$—$R^3$ in the S to R direction, and another unit may include $R^2$—$R^1$—$R^3$ in the S to R direction. Additionally or alternatively, the segment at $R^1$, $R^2$, and $R^3$ may be the same or different between each unit. For example, in one embodiment, each unit may include the same hydrophilic segment at $R^1$, the same pH-responsive segment at $R^2$, and the same endosomal disruption segment at $R^3$. In another embodiment, two or more repeat units may have different hydrophilic segments at $R^1$, different pH-responsive segments at $R^2$, and/or different endosomal disruption segments at $R^3$. Furthermore, in some embodiments, the composition may change between repeat units. For example, the one or more units may include $R^1$—$R^2$—$R^3$; $R^1$—$R^3$—$R^2$; $R^2$—$R^1$—$R^3$; $R^2$—$R^3$—$R^1$; $R^3$—$R^1$—$R^2$; $R^3$—$R^2$—$R^1$; $R^1$—$R^1$—$R^2$; $R^1$—$R^2$—$R^1$; $R^2$—$R^1$—$R^1$; $R^1$—$R^1$—$R^3$; $R^1$—$R^3$—$R^1$; $R^3$—$R^1$—$R^1$; $R^2$—$R^2$—$R^1$; $R^2$—$R^1$—$R^2$; $R^1$—$R^2$—$R^2$; $R^2$—$R^2$—$R^3$; $R^2$—$R^3$—$R^2$; $R^3$—$R^2$—$R^2$; $R^3$—$R^3$—$R^1$; $R^3$—$R^1$—$R^3$; $R^1$—$R^3$—$R^3$; $R^3$—$R^3$—$R^2$; $R^3$—$R^2$—$R^3$; $R^2$—$R^3$—$R^3$; or any combination or sub-combination thereof.

The at least one hydrophilic segment includes a hydrophilic monomer, which may be the same or different for each hydrophilic segment of the copolymer. Suitable hydrophilic monomers include, but are not limited to, methacrylates of polyethers, polyesters, polycarbonates, polyvinyls, polyamino acids, polysulfobetaines, carboxybetaines, or combinations thereof. In some embodiments, for example, the polyether includes poly(ethylene glycol) methyl ether methacrylate. In one embodiment, the poly(ethylene glycol) methyl ether methacrylate includes m number of ethylene oxide repeats. In another embodiment, m is between 3 and 150. Additionally or alternatively, in some embodiments, the hydrophilic monomer may be linked to the backbone through a cleavable bond such that the hydrophilic monomer is released under certain conditions.

The at least one pH-responsive segment includes an amine containing monomer, which may be the same or different for each pH-responsive segment of the copolymer. Suitable amine containing monomers include, but are not limited to, protonatable and/or tertiary amine containing monomers. In some embodiments, for example, the amine containing monomers include any monomer with an amine group and a pKa of between about 3 and about 9. In one embodiment, the amine containing monomer may include (2-diethylamino)ethyl methacrylate (DEAEMA), 2-(dimethylamino)ethyl methacrylate, 2-(diisopropylamino)ethyl methacrylate, 2-N-morpholinoethyl methacrylate, 2-amino methacrylate hydrochloride, or a combination thereof. In another embodiment, the amine containing monomer is DEAEMA.

The at least one endosomal disruption segment includes a hydrophobic monomer, which may be the same or different for each endosomal disruption segment of the copolymer. Suitable hydrophobic monomers include, but are not limited to, acrylates, alkyl methacrylates, methacrylates with fluorinated or aromatic pendant groups, and/or related monomers. In some embodiments, for example, the alkyl methacrylates include, but are not limited to, butyl methacrylate (BMA), hexyl methacrylate, octyl methacrylate, decyl methacrylate, and/or lauryl methacrylate. In one embodiment, the hydrophobic monomers include BMA.

As will be appreciated by those skilled in the art, the graft copolymer may include any suitable combination of the hydrophilic segments, pH-responsive segments, and endosomal disruption segments disclosed herein. In some embodiments, the combination of graft segments forms an amphiphilic graft copolymer. In one embodiment, for example, the graft copolymer includes poly[(poly(ethylene glycol) methyl ether methacrylate)-co-(2-(diethylamino) ethyl methacrylate)-co-(butyl methacrylate)] (PEGMA-EB), which has the structure:

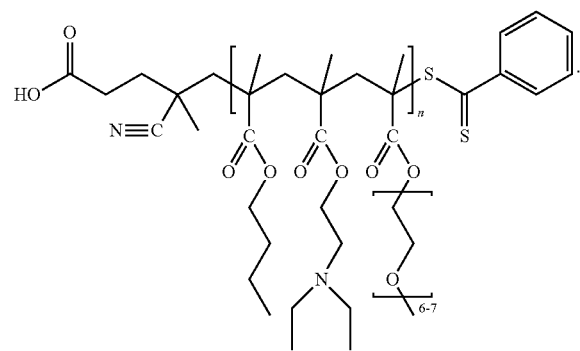

Although described herein primarily with regard to PEGMA-EB, the disclosure is not so limited and may include any other suitable combination of graft segments.

In some embodiments, the hydrophilic weight fraction may be selected and/or modified to provide desired properties of the graft copolymer. In one embodiment, for example, the graft copolymer includes a hydrophilic weight fraction of up to about 25%, between about 21% and about 24%, about 22%, or any combination, sub-combination, range, or sub-range thereof. At this hydrophilic weight fraction, the copolymer self-assembles into compound micelles. In another embodiment, the graft copolymer includes a hydrophilic weight fraction of between about 25% and about 30%, between about 26% and about 30%, between about 26% and about 29%, about 27%, or any combination, sub-combination, range, or sub-range thereof. At this hydrophilic weight fraction, the copolymer self-assembles into polymersomes.

Surprisingly, the present inventors also found that hydrophilic graft above certain lengths did not enhance drug delivery and/or did not form vesicles. For example, in some embodiments, the graft copolymers did not form vesicles with hydrophilic graft lengths of 950 Da or more, but did form vesicles at hydrophilic graft lengths of less than 950 Da. Accordingly, in some embodiments, the graft copolymers include hydrophilic graft lengths of less than 950 Da, less than 900 Da, less than 850 Da, less than 800 Da, less than 750 Da, between 50 Da and 950 Da, between 100 Da and 950 Da, between 150 Da and 950 Da, between 200 Da and 950 Da, between 250 Da and 950 Da, between 300 Da and 950 Da, between 300 Da and 900 Da, between 300 Da and 850 Da, between 300 Da and 800 Da, between 300 Da and 750 Da, or any combination, sub-combination, range, or sub-range thereof. In one embodiment, the graft copolymers include hydrophilic graft lengths of between 100 Da and 900 Da. In another embodiment, the graft copolymers include hydrophilic graft lengths of between 200 Da and 800 Da. As will be understood by those skilled in the art, any hydrophilic graft length disclosed herein may be combined with any hydrophilic weight fraction disclosed herein.

Additionally or alternatively, the molecular weight of the graft copolymer may be adjusted or selected to provide a desired property. There is a well-documented phenomenon in linear block copolymer structures in which with all other parameters held equal, increasing the molecular weight tends to bias self-assembly away from low curvature structures. In the context of developing vesicular carriers for drug delivery, to cite one particular example, this effect typically limits the molecular weight of vesicle comprising polymers to a relatively low molecular weight. The instant inventors previously found this bound to fall around 2 kDa and 5 kDa for the hydrophilic and hydrophobic blocks, respectively, for a poly[(ethylene glycol)-b-((2-diethylaminoethyl methacrylate)-co-(butyl methacrylate))] linear block copolymer. Surprisingly, this effect is weaker in graft copolymer structures, such that, unlike existing linear copolymers, the ability of the graft copolymers disclosed herein to self-assemble into compound micelles and/or polymersomes is not adversely affected by chain molecular weight. Accordingly, in some embodiments, polymers of up to a total molecular weight of 60 kDa are able to stably self-assemble into vesicular structures without further modification. Thus, the use of graft co-polymer architectures results in the ability to produce vesicles comprising relatively high molecular weight polymer chains.

Through the self-assembly discussed above, the graft copolymers disclosed herein are capable of encapsulating one or more different compounds. These different compounds include, but are not limited to, both hydrophilic and hydrophobic cargoes. As such, in some embodiments, these graft copolymers provide efficient, versatile intracellular drug delivery of the encapsulated compounds. Additionally or alternatively, in certain embodiments, the graft copolymers include higher molecular weights relative to block copolymers. In some embodiments, this relatively higher molecular weight enables different size particle formation, provides hemolysis potential, and/or facilitates cytosolic drug delivery. Furthermore, the ability to formulate these polymers into pH responsive vesicles comprised of high molecular weight, hydrophobic, and cationic polymer chains allows for encapsulation of both hydrophobic and hydrophilic cargoes into an endosomolytic nanoparticle. These are especially useful for versatile delivery of cargoes to the cytosolic compartment of endocytic cells, with wide ranging applications in fields such as vaccine design, immunotherapy, and gene therapy.

Without wishing to be bound by theory, it is believed that this is the first discussion of graft copolymer self-assembly of endosomolytic polyelectrolytes with hydrophilic (e.g., PEG) grafts randomly dispersed throughout the polymer backbone. This novel architecture changes many facts of polymer self-assembly, which yields many advantages, specifically when targeting vesicular self-assembly over the more commonly explored linear polymer architectures. For example, as opposed to linear PEG-EB for cytosolic drug delivery or graft copolymers forming compound micelles for drug encapsulation, the copolymers disclosed herein combine the endosomolytic polymer composition with a graft architecture to improve the functionality of these self-assembled graft copolymers for mediating intracellular drug delivery and endosomal escape.

Also provided herein, in some embodiments, is a method of forming the graft copolymer. In one embodiment, the instant copolymers may be formed through one-pot synthesis. The one pot synthetic procedure of graft copolymers allows for facile modification of the polymer hydrophilic moieties without a synthetically difficult modification of a macro-chain transfer agent, as would be required for a linear block copolymer structures. This increases its potential for clinical translation relative to other similar technologies. It also obviates the need for a multistep formulation process, as a chemical reduction step is not required after particle assembly. Additionally or alternatively, the instant systematic evaluation of polymer chain parameters introduces a degree of optimization that has heretofore been largely absent in the space of endosomolytic graft copolymers.

Figure 3:
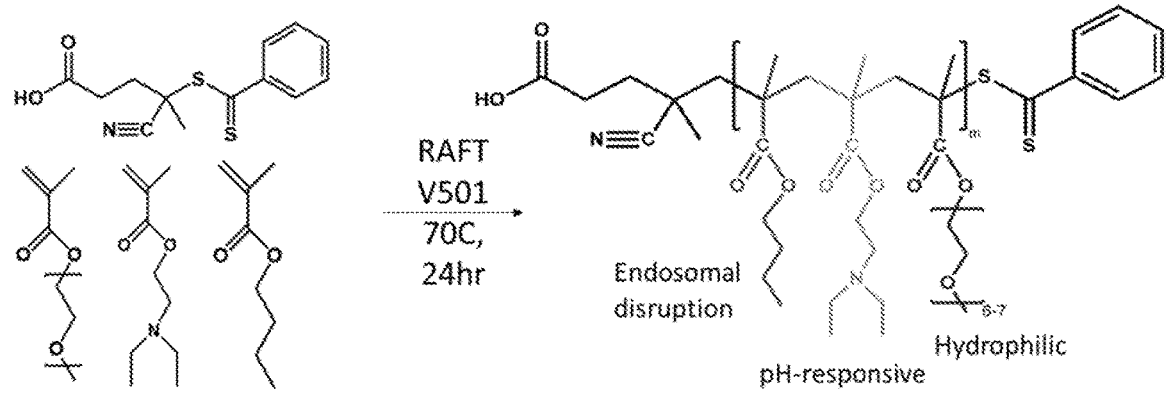
FIG. 3 shows a schematic of the synthesis of a PEGMA-co-EB polymer library with RAFT polymerization.

In one embodiment, the method includes reversible addition-fragmentation chain-transfer (RAFT) polymerization of the polymer backbone, hydrophilic segments, pH-responsive segments, and endosomal disruption segments (FIG. 3). As is understood by those skilled in the art, RAFT polymerization is a controlled radical polymerization technique where a chain transfer agent mediates polymerization through a reversible chain-transfer process. For example, in one embodiment, the hydrophilic segment is attached to the chain transfer agent, followed by introduction of free radicals. The introduction of the free radicals fragments a carbon-sulfur bond adjacent to a dithioate. Monomers are then added on during the polymerization process to form the desired polymer, after which various byproducts may be removed by precipitation and/or dialysis.

During RAFT polymerization the monomers are believed to add stochastically, forming the polymer including chemically different individual polymer chains having total average properties defined by the polymer feed and reaction kinetics of individual monomers. Accordingly, the composition/concentration of monomers in the polymer feed (i.e., what is added in the reaction) is selected to provide the desired properties of the polymer. For example, in one embodiment, the ratio of monomers in the polymer feed is selected to provide the desired ratio of hydrophilic, pH-responsive, and/or endosomal disruption monomers in the resulting polymer. In another embodiment, the choice of monomer and monomer composition is modulated to permit tuning of pH-responsive properties and membrane destabilizing activity.

In another embodiment, the method includes loading the polymer with one or more active agents. The term "active agent," as used herein, refers to any compound used for the treatment or diagnosis of a disease. Suitable active agents include, but are not limited to, compounds that rely on intracellular access, compounds that rely on access to cytosolic receptors/pathways, stimulator of interferon genes (STING) agonists or antagonists such as cyclic dinucleotides (CDN), oligonucleotides, proteins, polysaccharides, peptides, lipopeptides, hydrophobic and amphiphilic small molecular drugs, antibodies, nanobodies, RNA, mRNA, miRNA, siRNA, aptamers, antibiotics, antigens (e.g., tumor antigens, tumor neoantigens), chemotherapeutics, imaging agents, quantum dots, any other suitable compound for disease treatment, or a combination thereof.

In one embodiment, for example, the active agent includes one or more CDNs or other STING pathway agonists. STING (also known as TMEM173, MIT A, ERIS, and MPYS) is a transmembrane endoplasmic reticulum (ER) protein that undergoes a conformational change in response to direct binding of cyclic dinucleotides (CDNs), resulting in a downstream signaling cascade involving TBK1 activation, IRF-3 and/or STAT6 phosphorylation, and production of IFN-β and other cytokines. The STING pathway in tumor-resident host antigen presenting cells is involved in the induction of a spontaneous CD8+ T cell response against tumor-derived antigens. Specific CDNs include, but are not limited to, 2'3'-cGAMP, c-di-GMP, 2'3'-cGAM(PS)$_2$ (Rp/Sp), and c-[2'FdGMP]-[2'FdAMP]. STING agonists and CDNs, and uses thereof, include without limitation those described in U.S. Pat. Nos. 7,709,458, 7,592,326, 8,450,293, 9,315,523, 9,549,944, and 9,597,391; and PCT Publication Nos. WO 2011/003025, WO 2014/093936, WO 2014/099824, WO 2014/189805, WO 2014/179335, WO 2014/179760, WO 2015/074145, WO 2016/096174, WO 2016/096577, WO 2016/120305, WO 2016/145102, WO 2017/027645, WO 2017/027646, and WO 2017/075477, the disclosures of which are hereby incorporated by reference as it relates to CDNs and their use.

As will be appreciated by those skilled in the art, different types of cargo may be simultaneously loaded into and/or onto the polymer vesicle through one or more of the methods disclosed herein. The simultaneous loading of different types of cargo provides combination loading of chemically diverse cargo. For example, different types of cargo may be simultaneously encapsulated in, associated with, or conjugated to a single polymer vesicle. In another example, chemically diverse cargo may be loaded through a combination of encapsulation, association with the vesicle membrane, and/or conjugation to the surface of the vesicle.

When loaded, the polymer vesicles increase cellular uptake and/or cytosolic delivery of the one or more loaded active agents as compared to delivery of the active agent alone or with existing compositions. In some embodiments, for example, the pH-responsive and/or membrane destabilizing properties of the polymer vesicle may facilitate and/or increase escape of the vesicle-associated cargo from endolysosomal trafficking. For example, in one embodiment, the polymer vesicle is stable at first pH, such as a physiological pH (e.g., about 7.4), and disassembles at a lower pH, such as an acidic pH (e.g., less than 6.6). In another embodiment, the polymer vesicles are stable upon administration, but as the vesicle subsequently encounters a lower pH environment (e.g., following endocytosis and/or in certain tumor types), the amino groups in the graft copolymer group become more protonated. Higher protonation increases the aqueous solubility of the copolymer and, therefore, the vesicle assembly is no longer energetically favorable, resulting in disassembly of the vesicle into soluble polymer chains or other morphologies (e.g., micelles). This process releases encapsulated cargo and permits the protonated copolymer to disrupt the endosomal membrane, which increases delivery of cargo to cytosolic targets.

The loading of the polymer vesicles facilitates disease treatment with various individual or combined active agent(s). Accordingly, also provided herein is a method of administering one or more active agents to a cell or organism (e.g., a human), the method including administering a polymer vesicle loaded with one or more active agents. In some embodiments, the polymer vesicle is administered with one or more suitable pharmaceutical carriers. Further provided herein is a method of treating a disease, the method including administering an effective amount of a polymer vesicle loaded with one or more active agents to a cell or organism in need thereof. Such treatment may be prophylactic, preventative, and/or active (i.e., to treat an active/existing condition or disease).

As used herein, the term "effective amount" refers to an amount that, when administered alone or in combination with an additional therapeutic agent to a cell, tissue, or subject, is effective to cause a measurable improvement in one or more symptoms of disease, for example cancer or the progression of cancer. An effective dose further refers to that amount of an agent sufficient to result in at least partial amelioration of symptoms, e.g., tumor shrinkage or elimination, lack of tumor growth, increased survival time. When applied to an individual active ingredient administered alone, an effective dose refers to that ingredient alone. When applied to a combination, an effective dose refers to combined amounts of the active ingredients that result in the therapeutic effect, whether administered in combination, serially or simultaneously. An effective amount of a therapeutic will result in an improvement of a diagnostic measure or parameter by at least 10%; usually by at least 20%; preferably at least about 30%; more preferably at least 40%, and most preferably by at least 50%. An effective amount can also result in an improvement in a subjective measure in cases where subjective measures are used to assess disease severity. Generally, the dose may begin with an amount somewhat less than the optimum dose and then increased by small increments thereafter until the desired or optimum effect is achieved relative to any negative side effects. Important diagnostic measures include those of symptoms of, e.g. in the case of a STING agonist, the inflammation or level of inflammatory cytokines produced.

The loaded polymer vesicles may be administered through any suitable route including, but not limited to, intratumoral injection, intravenous (IV), subcutaneous, or a combination thereof. Other routes of administration may include oral, topical, cutaneous, transdermal, intradermal, intramuscular, intraperitoneal, intracranial, mucosal, transmucosal, intranasal, pulmonary, inhalation, direct intraventricular, rectal, intestinal, parenteral, intramedullary, intrathecal, intraocular, insufflation, intra-arterial, or a combination thereof.

As will be understood by those skilled in the art, the frequency of administration may be determined by the type of active agent, the concentration of active agent, and/or the purpose of administration. In some embodiments, the loaded vesicles disclosed herein may be administered by continuous infusion or by doses administered. Doses administration includes, but is not limited to, daily, 1-7 times per week, weekly, bi-weekly, monthly, bimonthly, quarterly, semiannually, annually, or any other suitable frequency. Although primarily described herein with regards to cancer/tumor treatment, as will be appreciated by those skilled in the art, the disclosure is not so limited and includes any other treatment or application for which intracellular delivery of active agent(s) is suitable. One other application includes vaccines, such as, for example, delivery of CDNs co-encapsulated with protein and/or peptide antigens. In some embodiments, the co-encapsulation of CDNs and protein/peptide antigens provides increased antigen delivery and/or increased antigen presentation.

The presently-disclosed subject matter is further illustrated by the following specific but non-limiting examples. The following examples may include compilations of data that are representative of data gathered at various times during the course of development and experimentation related to the presently-disclosed subject matter.

EXAMPLES

Example 1

In this example, poly(ethylene glycol) graft copolymer polyelectrolytes are developed for encapsulation of versatile cargoes for efficient intracellular drug delivery. The investigated polymers specifically include poly[(poly(ethylene glycol) methyl ether methacrylate)-co-(2-(diethylamino) ethyl methacrylate)-co-(butyl methacrylate)] graft copolymers (PEGMA-EB), although design considerations established here in principle apply to a broader class of amphiphilic graft copolymers with similar weight ratios between a hydrophobic backbone and grafted hydrophilic block segments.

Figure 4:
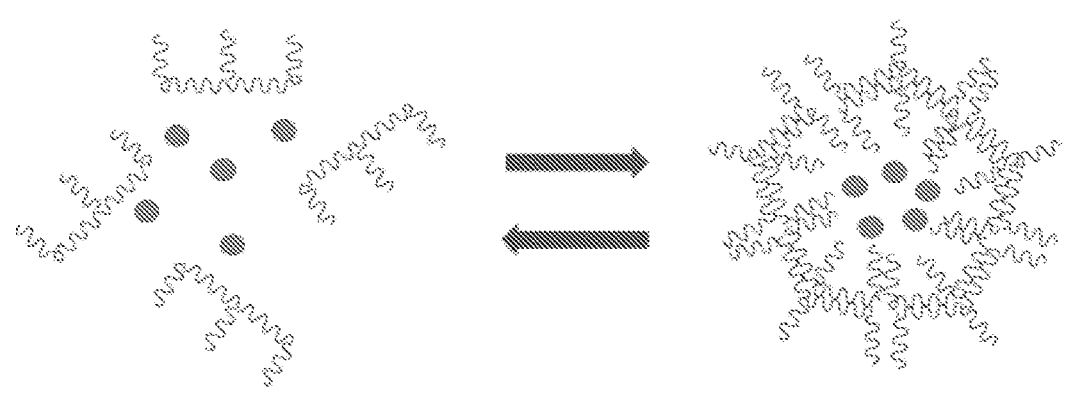
FIG. 4 shows a schematic illustrating examination of the self-assembly parameters of polymers.
Figure 5:
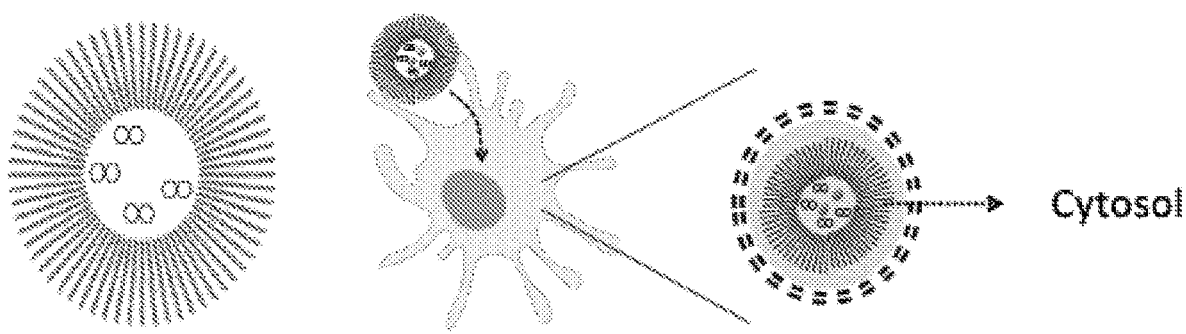
FIG. 5 shows a schematic illustrating quantification of drug delivery competency of polymers in vitro. Parameters measured include endosomolytic activity (hemolysis), drug loading efficiency (HPLC), and drug delivery efficacy (reporter assay).

The effect of hydrophilic weight fraction and molecular weight was systematically explored on self-assembled nanoparticle morphologies (FIG. 4), and a class of (PEGMA-EB) was identified with hydrophilic weight fractions of wPEG ~22% and wPEG ~27% that self-assemble into compound micelles and polymersomes, respectively. Parameters measured include particle size (DLS) and particle morphology (TEM). These nanoparticles were identified as promising candidates for versatile drug delivery for their ability to encapsulate both hydrophilic and hydrophobic cargoes (FIG. 5). It was also noted that unlike that of linear copolymers, the ability of these PEGMA-EB copolymers to self-assemble into useful morphologies was not adversely affected by chain molecular weight. As such, it was found that graft copolymer architectures allow formulation of polymer chains as large as 60 kDa into vesicular morphologies. Given the importance of high molecular weights in polymer mediated endosomal disruption, these high molecular weight PEGMA-EB polymers were further identified as promising candidates for cytosolic drug delivery.

Formation and Characterization

Figure 6:
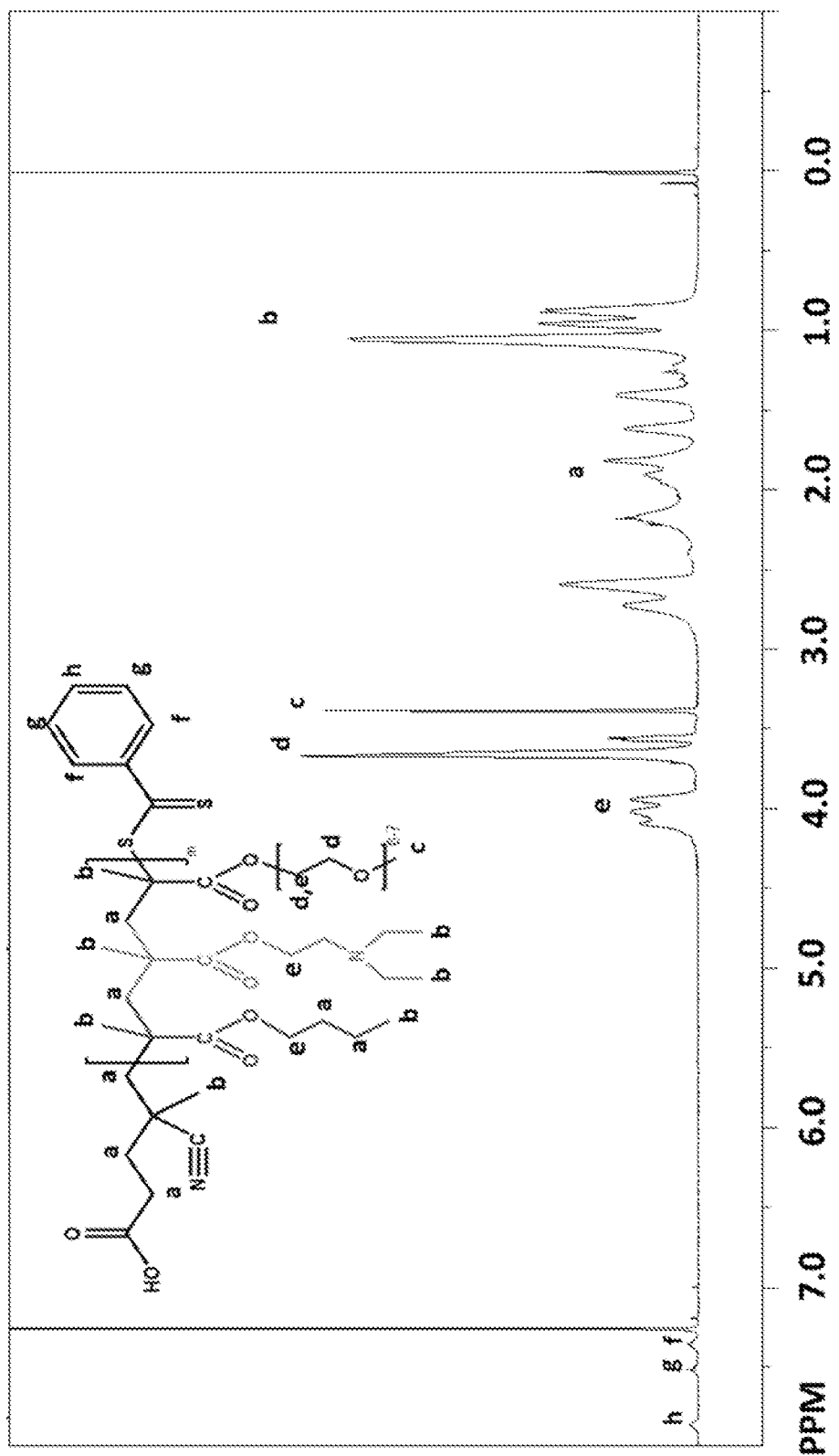
FIG. 6 shows a graph illustrating polymer characterization through a labeled representative NMR spectrum of synthesized PEGMA-co-EB.

A library of PEGMA-EB polymers was synthesized by systematically varying hydrophilic weight fraction, hydrophilic graft length, and chain molecular weight. Polymers were formulated into pH 7.4 aqueous media and evaluated with transmission electron spectroscopy and dynamic light scattering to determine resultant morphology to determine promising candidates for future biological evaluation (FIG. 6).

Self-Assembly Behavior of Polymers

Figure 7A:
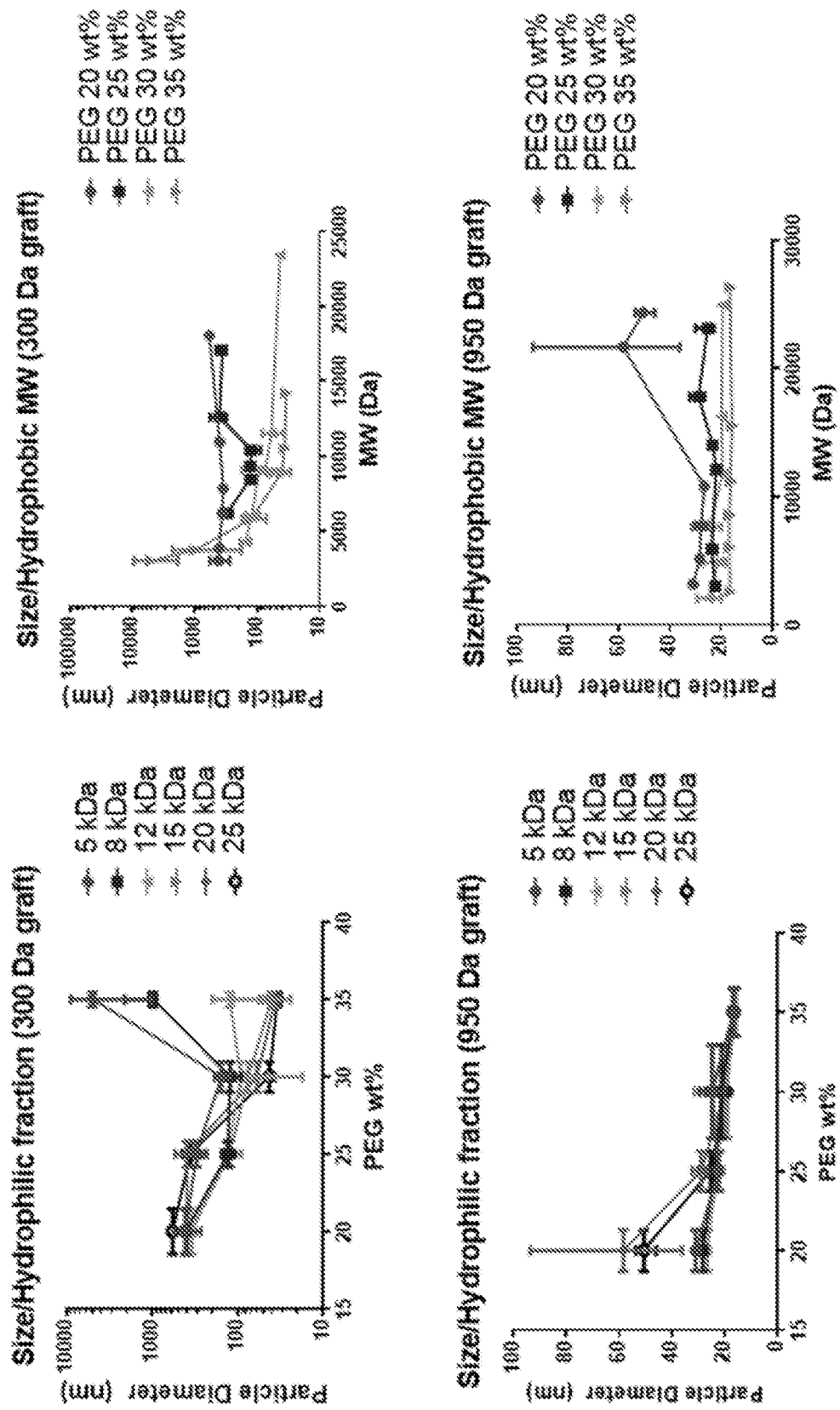
FIG. 7 shows graphs illustrating phase space/self-assembly characterization of synthesized PEGMA-co-EB.
Figure 7B:
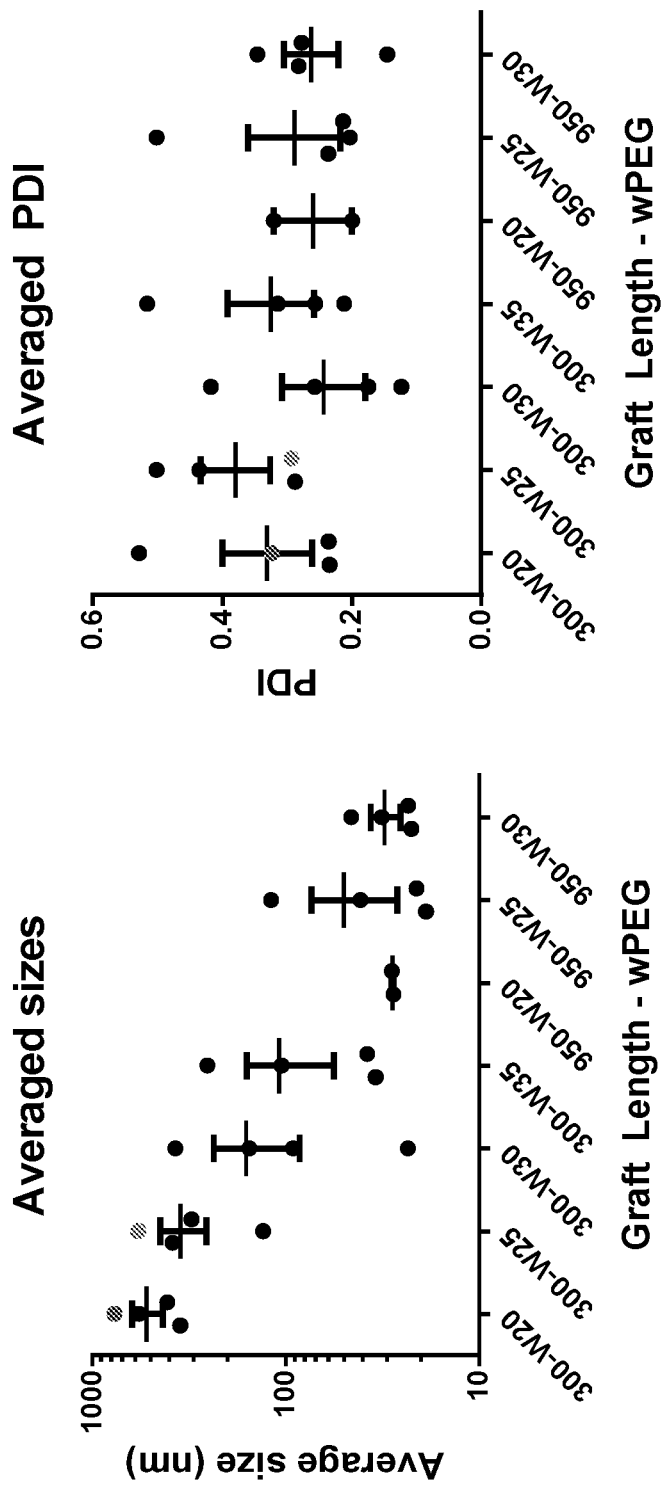
Figure 8A:
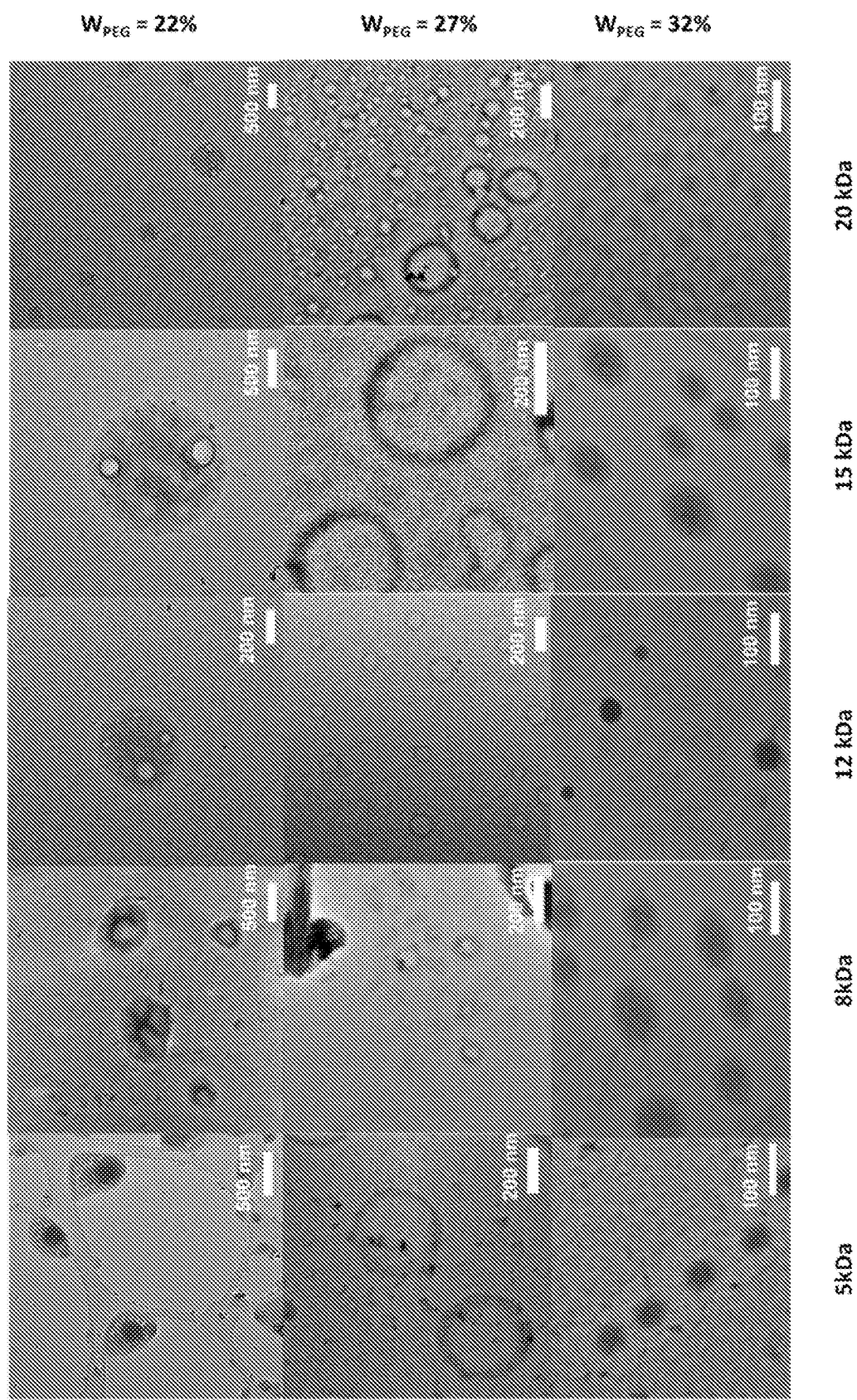
FIGS. 8A-B show images of polymer self-assembly at different weights. (A) 300 Da graft library exhibit block copolymer-like phase transitions, while (B) 950 Da library shows mostly micellar structures.
Figure 8B:
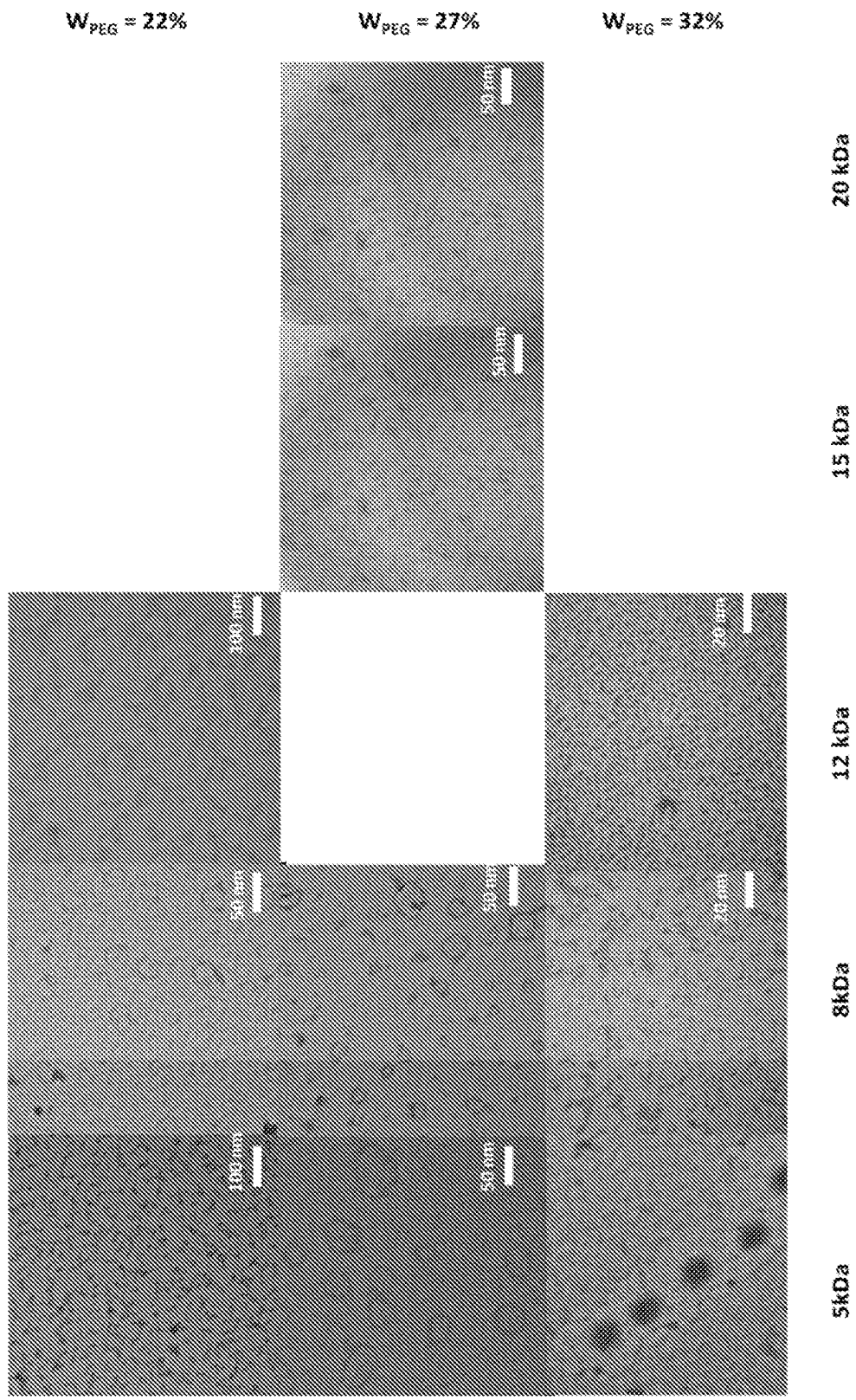

While analogous self-assembly behavior compared to block copolymers was observed, distinct properties were also noted (FIG. 7A). More specifically, hydrophilic weight fraction was a dominant factor in determining NP size and morphology, while hydrophobic MW appeared to have little influence. It was also found that size inversely correlates with PEG (hydrophilic) weight percent (wPEG) and PEG graft length while polydispersity index (PDI) is unaffected (FIG. 7B). This point was highlighted with the observed vesicular bilayer self-assembly at 20 kDa (FIGS. 8A-B). Previous work with block copolymers showed a bias against bilayer assemblies at high hydrophobic MWs, which suggests a difference in phase behavior for the instant system.

Bioactivity and Drug Delivery Competency of Polymers

Figure 9A:
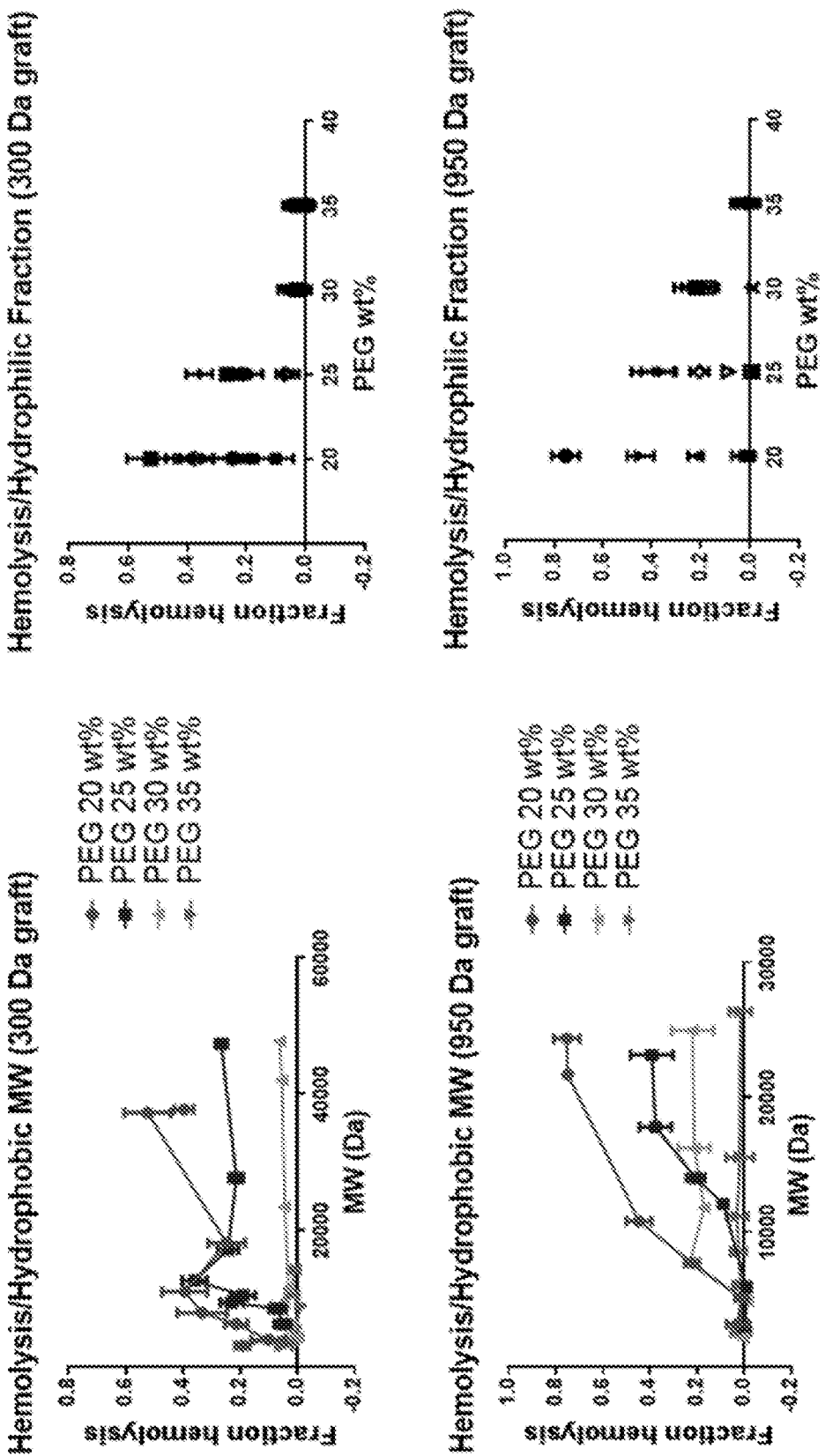
FIGS. 9A-B shows graphs illustrating bioactivity characterization of synthesized polymers. (A) shows hemolysis of 300 Da and 950 Da hydrophilic grafts at different hydrophobic MW and hydrophilic fraction. (B) shows membrane lysis assay of graft copolymers having different overall MW and hydrophilic fraction.
Figure 9B:
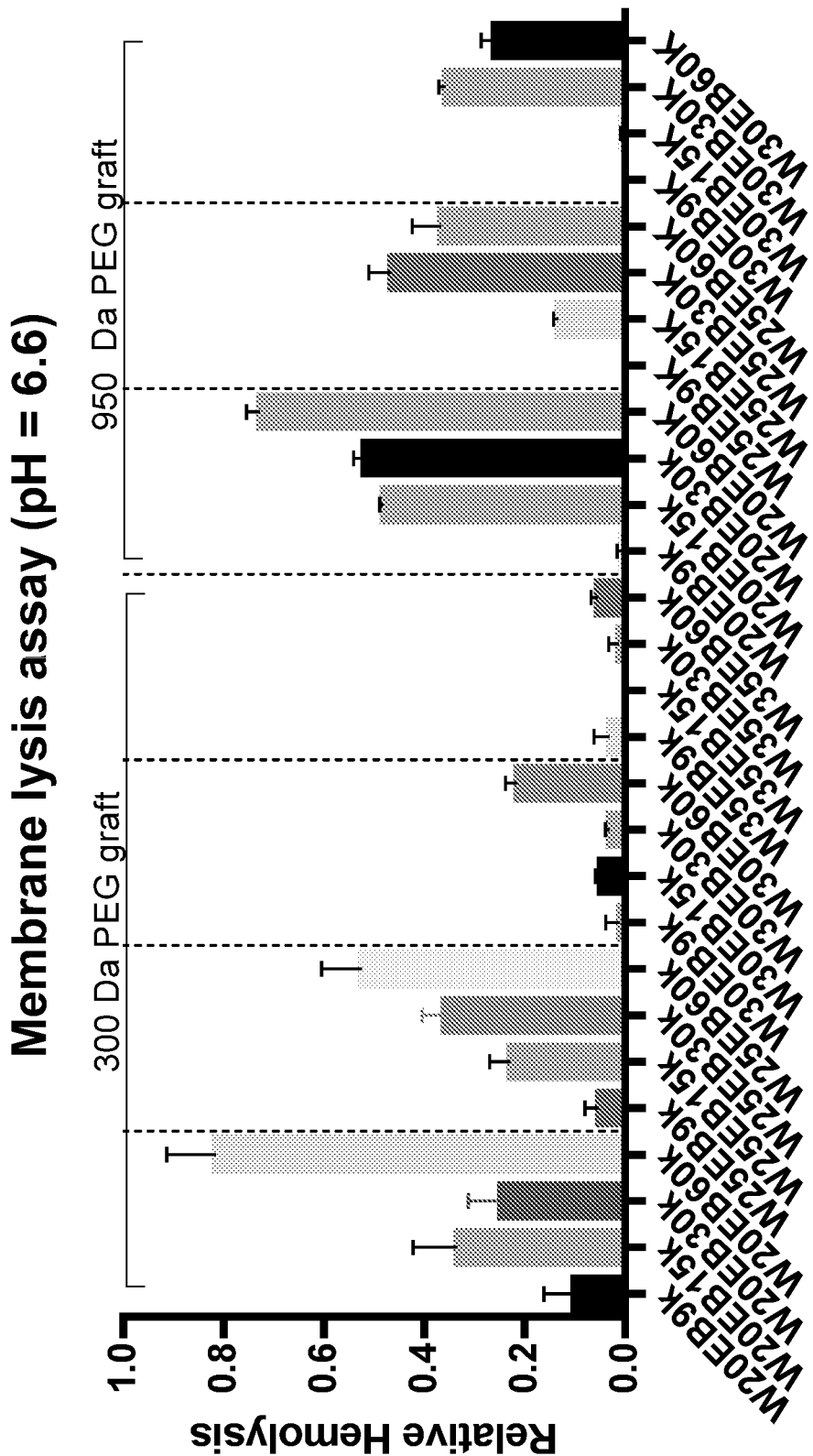
Figure 10A:
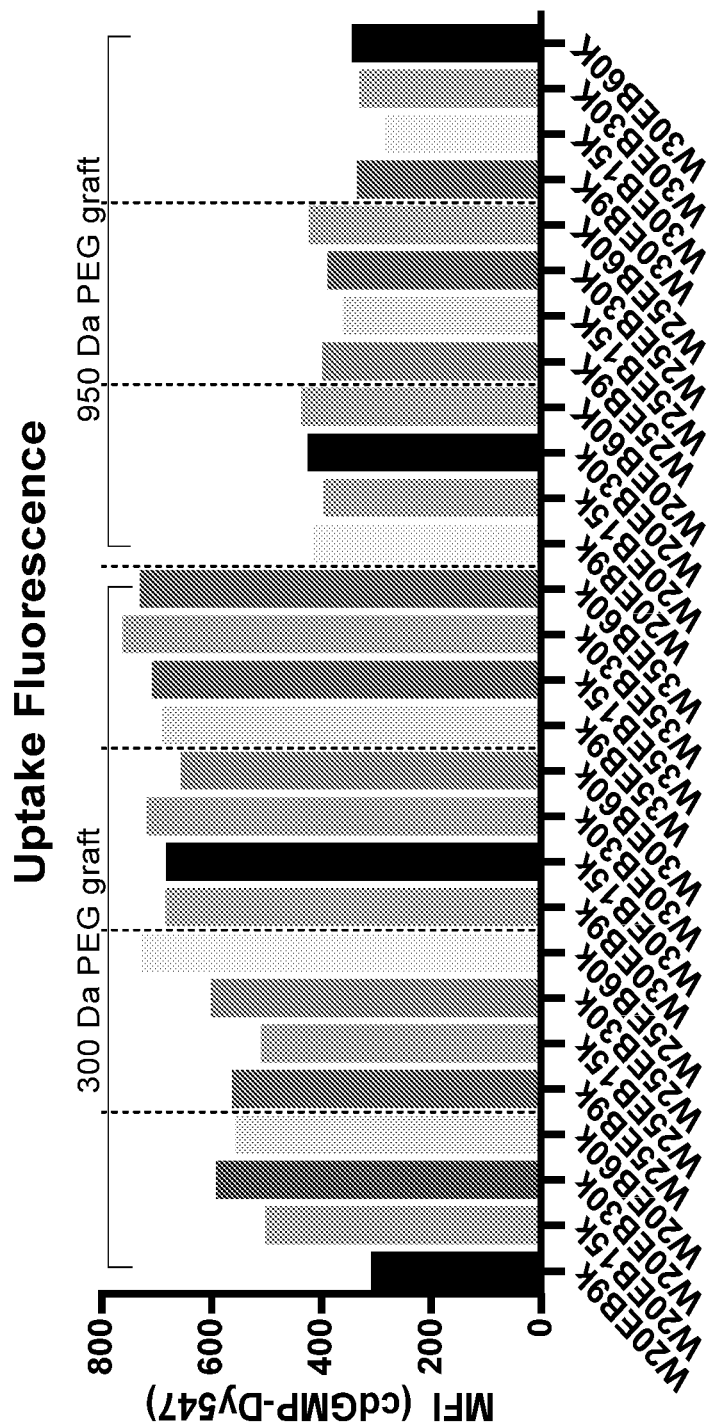
FIGS. 10A-D show a table and graphs illustrating uptake by THP-1 ISG reporter cells and drug delivery to THP-1 ISG reporter cells with various graft copolymers. (A) shows THP-1 uptake assay screening of formulations with different polymer MW and hydrophilic graft weight fractions. (B) shows the effects of morphology on delivery of cGAMP, a hydrophilic drug, to THP-1 ISG reporter. (C) shows THP-1 ISG reporter cell assay in the context of cGAMP delivery for 300 Da PEG graft library. (Dashed line—Half-maximal response of cGAMP at 40 µM). (D) shows THP-1 ISG reporter cell assay in the context of cGAMP delivery for 950 Da PEG graft library.
Figure 10B:
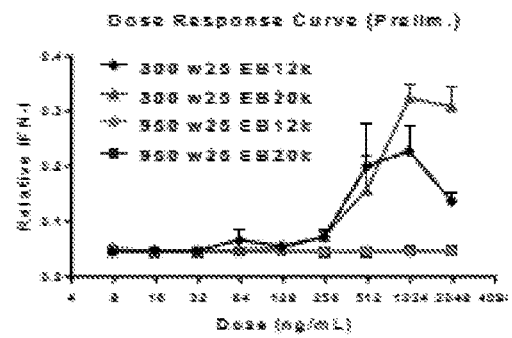
Figure 10C:
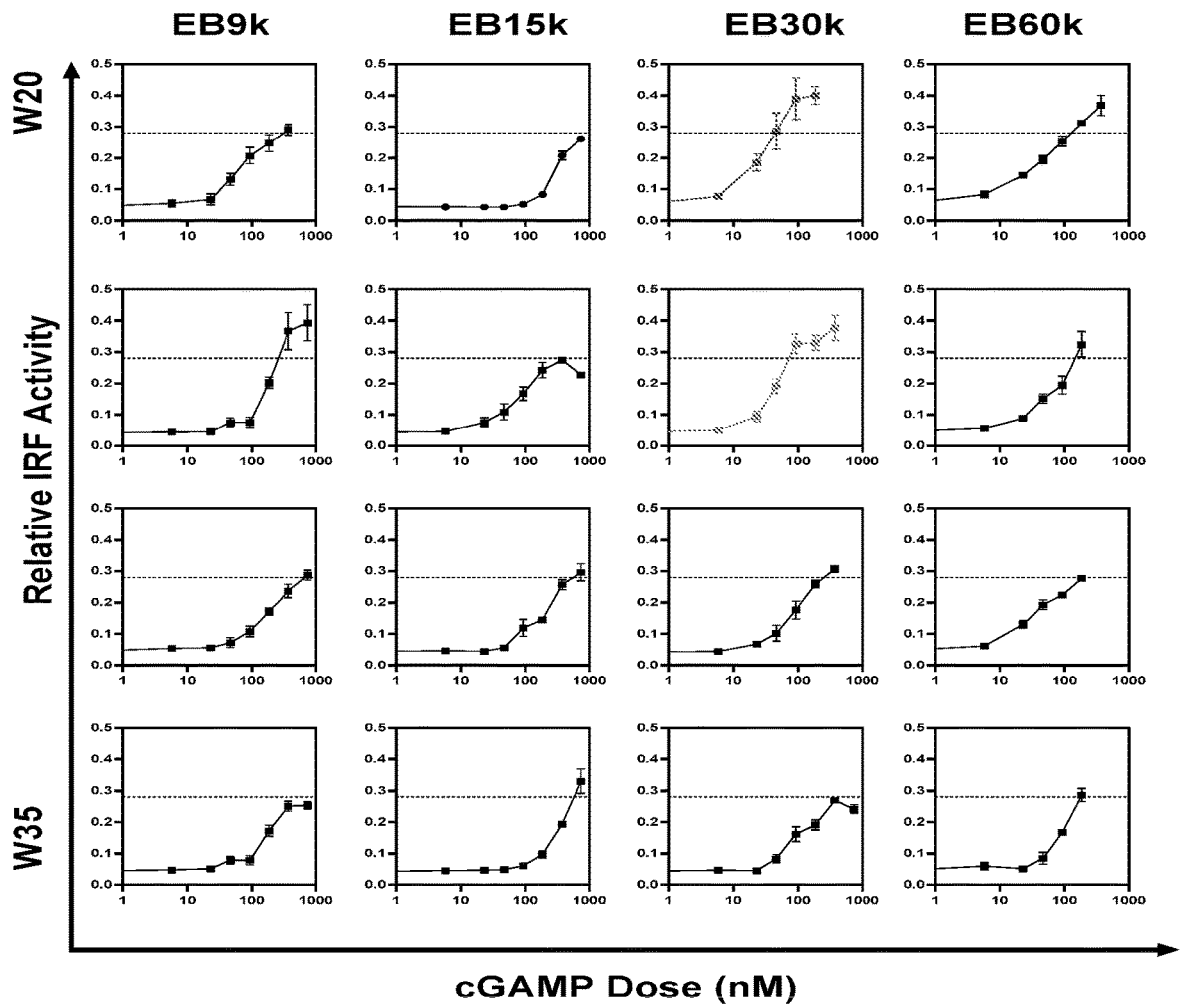
Figure 10D:
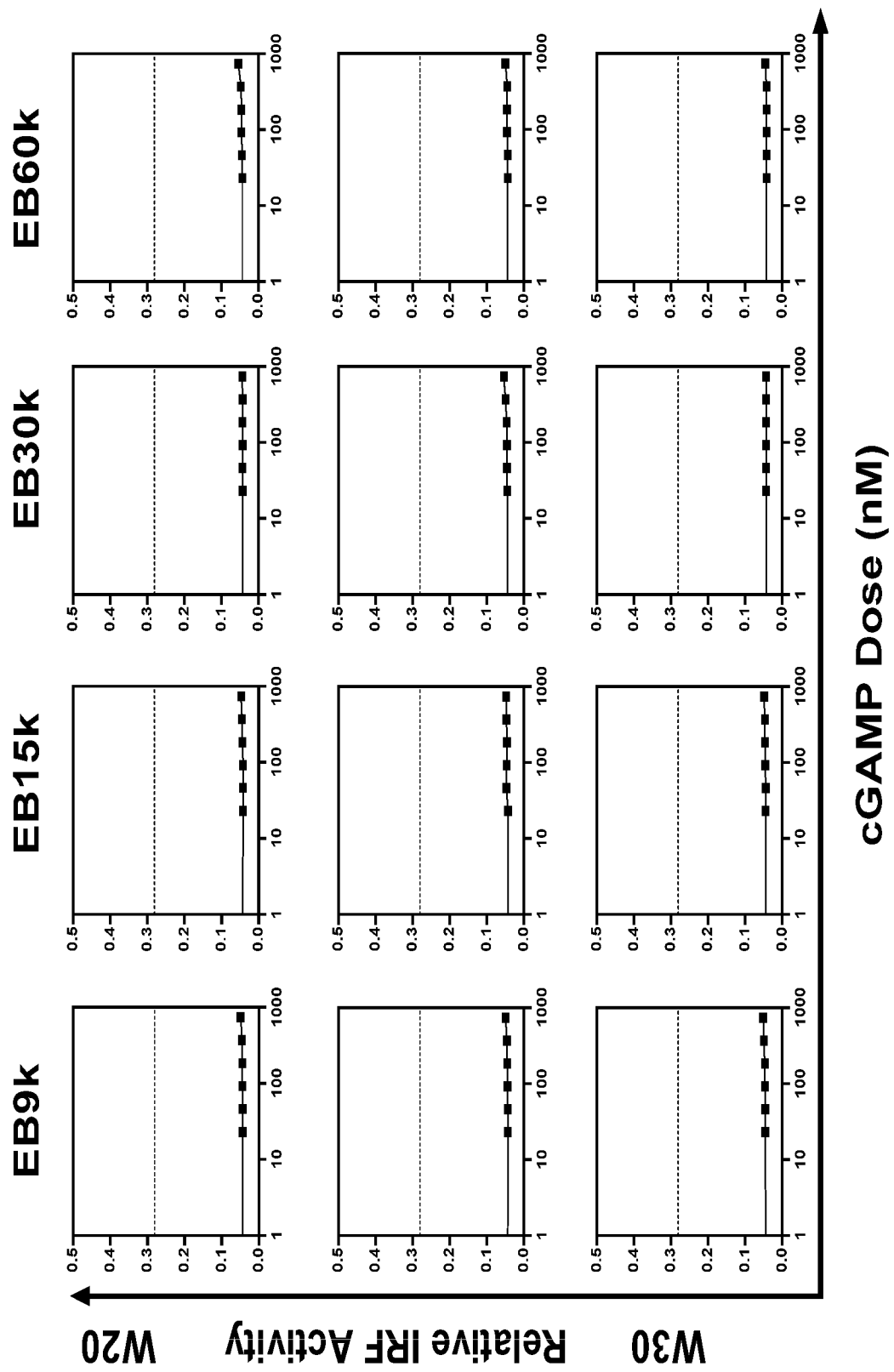

The graft copolymers disclosed herein were next tested for bioactivity and drug delivery properties. As illustrated in FIGS. 9A-B, hemolysis, a measure of endosomolytic activity, increases with increasing MW and decreases with increasing hydrophilic weight fraction. Turning to FIGS. 10A-D, THP-1 ISG reporter cells were used to determine cellular uptake and cGAMP delivery. More specifically, FIG. 10A shows that shorter hydrophilic (e.g., PEG) graft lengths are generally associated with higher uptake; FIG. 10B shows vesicular NPs and higher-MW polymers demonstrated better performance in terms of delivering cGAMP, a hydrophilic drug, to THP-1 ISG reporter cells; FIG. 10C shows the effects of hydrophobic (EB) MW and hydrophilic weight fractions (wPEG) on cGAMP delivery with 300 Da PEG grafts; and FIG. 10D shows the effects of hydrophobic (EB) MW and hydrophilic weight fractions (wPEG) on cGAMP delivery with 950 Da PEG grafts. As discussed above, while the 300 Da PEG grafts all showed activity, the 950 Da PEG grafts surprisingly did not.

Treatment

Figure 11:
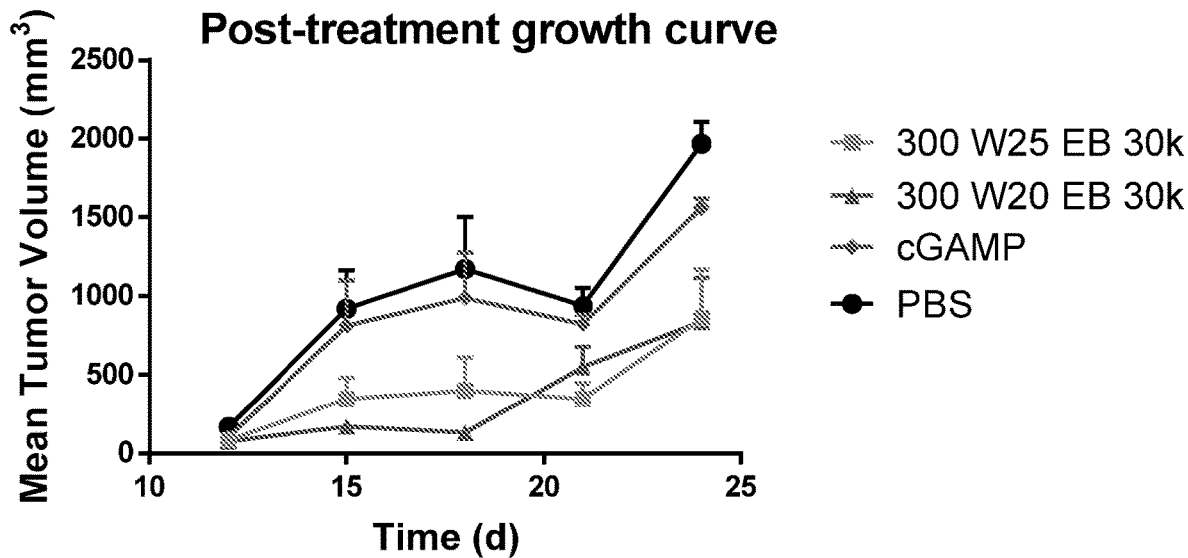
FIG. 11 shows a graph illustrating tumor growth in B16.F10 Melanoma Model, treated with either PBS, free cGAMP or cGAMP-encapsulated nanoparticle formulations.
Figure 12:
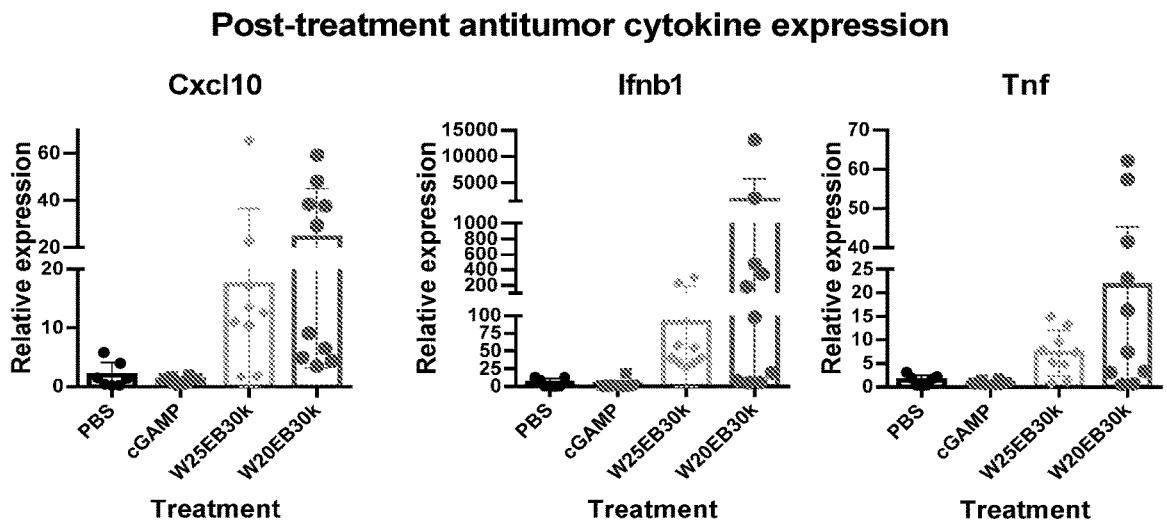
FIG. 12 shows qPCT-determined expression of antitumor cytokines for different treatments.

Finally, the graft copolymers were tested for their ability to treat tumor cells through delivery of encapsulated cGAMP. To evaluate tumor growth, the B16.F10 Melanoma Model was treated with either PBS, free cGAMP, or cGAMP-encapsulated nanoparticle formulations. As shown in FIG. 11, the models treated with the graft copolymers nanoparticle formulations disclosed herein exhibited slower tumor growth. Additionally, qPCR-determined expression of antitumor cytokines for different treatments illustrated that all candidate nanoparticle formulations outperform non-treated and free cGAMP treatment (FIG. 12).

In conclusion, the graft copolymers disclosed herein exhibited efficient cellular uptake, membrane lysis activity, and significant response to delivery of hydrophilic drugs. Additionally, the graft copolymers disclosed herein demonstrated slowed tumor growth and enhanced cytokine expression in an in vivo immunotherapy context. As such, the graft copolymers disclosed herein form highly effective drug delivery system for a hydrophilic drug that exhibit therapeutic potential.

It will be understood that various details of the presently disclosed subject matter can be changed without departing from the scope of the subject matter disclosed herein. Furthermore, the foregoing description is for the purpose of illustration only, and not for the purpose of limitation.

All publications, patents, and patent applications mentioned in this specification are herein incorporated by reference to the same extent as if each individual publication, patent, or patent application was specifically and individually indicated to be incorporated by reference, including the references set forth in the following list:

REFERENCES

[1] Jain, S; and Bates, F. S. *Consequences of Nonergodicity in Aqueous Binary PEO-PB Micellar Dispersions.*
[2] Discher, D. E.; Ahmed, F. *Polymersomes.*
[3] Murthy, N.; Robichaud, J. R.; Tirrell, D. A.; Stayton, P. S.; Hoffman, A. S. *The design and synthesis of polymers for eukaryotic membrane disruption.*
[4] Manganiello, M. J.; Cheng, C.; Convertine, A. J.; Bryers, J. D.; Stayton, P. D., *Diblock copolymers with tunable pH transitions for gene delivery*, Biomaterials 2012 March; 33(7); 2301-2309
[5] Shae, D. et al., *Endosomolytic polymersomes increase the activity of cyclic dinucleotide STING agonists to enhance cancer immunotherapy*, Nat. Nanotechnol. 14, 269 (2019).

While the disclosure is susceptible to various modifications and alternative forms, specific embodiments thereof have been shown by way of example in the drawings and are herein described below in detail. It should be understood, however, that the description of specific embodiments is not intended to limit the disclosure to cover all modifications, equivalents and alternatives falling within the spirit and scope of the disclosure as defined by the appended claims.

What is claimed is:

1. A graft copolymer, comprising:
a polymer backbone of the following formula:

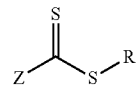

wherein:
Z is phenyl;
R is selected from the group consisting of alkyl, substituted alkyl, cycloalkyl, substituted cycloalkyl, aryl, substituted aryl, S, $SR^1$, N, $NR^1$, $N(R^1)_2$, and combinations thereof; and $R^1$ is selected from the group consisting of alkyl, substituted alkyl, cycloalkyl, substituted cycloalkyl, aryl, substituted aryl, and combinations thereof; and
three segments randomly grafted to the polymer backbone, the segments being selected from a hydrophilic segment, a pH-responsive segment, and an endosomal disruption segment.

2. The graft copolymer of claim 1, wherein the polymer backbone and three segments form a structure according to Formula II:

Formula II

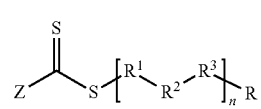

wherein each of $R^1$, $R^2$, and $R^3$ independently represent one of the hydrophilic segments, the pH-responsive segments, and the endosomal disruption segments, provided that each of $R^1$-$R^3$ are different; and
n is between 1 and 300.

3. The graft copolymer of claim 1, wherein R is 4-cyano-4-yl-pentanoic acid.

4. The graft copolymer of claim 2, wherein, when n is greater than 1, at least one repeating unit comprises a different combination of $R^1$, $R^2$, and $R^3$ from one or more other repeating units.

5. The graft copolymer of claim 1, wherein the hydrophilic segment is selected from the group consisting of methacrylates of polyethers, polyesters, polycarbonates, polyvinyls, polyamino acids, polysulfobetaines, carboxybetaines, and combinations thereof.

6. The graft copolymer of claim 5, wherein the hydrophilic segment is poly(ethylene glycol) methyl ether methacrylate (PEGMA).

7. The graft copolymer of claim 1, wherein the hydrophilic segment is linked to the backbone through a cleavable bond.

8. The graft copolymer of claim 1, wherein the pH-responsive segment is an amine containing monomer.

9. The graft copolymer of claim 8, wherein the amine containing monomer is selected from the group consisting of protonatable amine containing monomers, tertiary amine containing monomers, and combinations thereof.

10. The graft copolymer of claim 8, wherein the amine containing monomer comprises a pKa of between about 3 and about 9.

11. The graft copolymer of claim 1, wherein the pH-responsive segment is selected from the group consisting of (2-diethylamino)ethyl methacrylate (DEAEMA), 2-(dimethylamino)ethyl methacrylate, 2-(diisopropylamino)ethyl methacrylate, 2-N-morpholinoethyl methacrylate, 2-amino methacrylate hydrochloride, and combinations thereof.

12. The graft copolymer of claim 1, wherein the endosomal disruption segment is a hydrophobic monomer.

13. The graft copolymer of claim 12, wherein the hydrophobic monomer is selected from the group consisting of acrylates, alkyl methacrylates, methacrylates with fluorinated or aromatic pendant groups, related monomers, and combinations thereof.

14. The graft copolymer of claim 12, wherein the endosomal disruption segment is butyl methacrylate.

15. The graft copolymer of claim 2, wherein the graft copolymer has the structure:

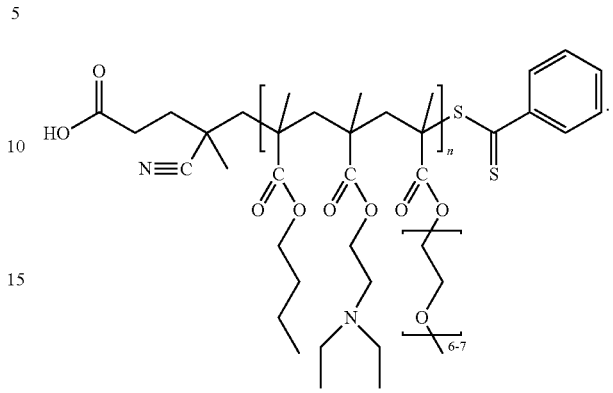

16. The graft copolymer of claim 1, further comprising a hydrophilic weight fraction selected from the group consisting of up to about 25% and between about 26% and about 30%.

17. A method of delivering an active agent to a subject in need thereof, the method comprising encapsulating the active agent with the graft copolymer of claim 1 and administering the encapsulated active agent to the subject.

18. The graft copolymer of claim 1, further comprising an active agent encapsulated therein.

* * * * *